United States Patent [19]
Weintraub et al.

[11] 4,261,006
[45] Apr. 7, 1981

[54] REMOTE CONTROL OF VIDEO

[76] Inventors: Morton Weintraub, 1542 47th St.;
Elliot Waxman, 1825 50th St.;
Bernard Gendelman, 1340 52nd St.,
all of Brooklyn, N.Y. 11219

[21] Appl. No.: 21,554

[22] Filed: Mar. 19, 1979

Related U.S. Application Data

[63] Continuation-in-part of Ser. No. 911,168, Mar. 30, 1978, abandoned, which is a continuation-in-part of Ser. No. 707,855, Jul. 22, 1976, abandoned.

[51] Int. Cl.³ ............................................. H04N 9/60
[52] U.S. Cl. ...................................... 358/3; 358/89; 358/194.1
[58] Field of Search ..................... 358/3, 194.1, 88, 89

[56] References Cited
U.S. PATENT DOCUMENTS 4,145,720  3/1979  Weintraub et al. ................. 358/194

OTHER PUBLICATIONS
Electronic Servicing, Jan. 1975, pp. 25–27.

*Primary Examiner*—Robert L. Richardson

[57] ABSTRACT

This invention relates to a system providing for the remote control of video signals controlling remotely television channel selection and plural functions including tuning the composite television signal, manually varying the channel selection of the tuner, mixing of an auxiliary intelligence signal into the incoming signal when it is in the baseband format, simulation of depth picture on the television screen giving a three dimensional affect, manually varying the characteristics of the baseband luminance, chrominance and audio information as a function of viewer preference. The invention also provides for a wireless coupler for separately retrieving the auxiliary intelligence signal and reproducing it. Receiver functions are controlled without direct connection or modification to the receiver.

5 Claims, 6 Drawing Figures

4,261,006

REMOTE CONTROL OF VIDEO

This is a continuation in part of the copending applications of Morton Weintraub et al Ser. No. 911,168, filed Mar. 30, 1978 which is a continuation in part of Ser. No. 707,855 filed July 22, 1976 both now abandoned.

DESCRIPTION OF PRIOR ART

Remote control apparatuses found in prior art control television receivers via different control parts that have built into the receiver in order to enable the user to exercise remote control over the receiver's tuning and plural function controls.

Remote control apparatuses found in prior art do not provide controls for controlling the picture image in so far as to provide for a greater debth image giving a three dimentional affect on the TV screen, as a function of viewer preference.

SUMMARY OF THE INVENTION

It is therefore among the principle objects of this invention to provide a wireless remote control system for controlling remotely the composite television signal, including luminance, chrominance and audio information.

Another object of this invention is to provide a remote control apparatus that would allow for remote wireless control of the picture image, including creating a debth image on the TV screen providing a three dimentional affect.

Other objects of this invention will become more apparent during the course of this disclosure.

BACKGROUND OF THE INVENTION

This invention relates to the remote control of video signals, wirelessly controlling television channel selection and plural function control, particularly, the control of the television image or picture on the TV screen in creating special affects of a debth image giving a three dimentional affect.

Summarizing now the description of the E.G.R.C. Model 3, master drive for television reception in the application of subcarrier waves for electronic guided remote control. See FIG. 1.

Antenna (82) passes on, all received television channels transmitted into the air waves, to radio frequency amplifier (83). The selected signal, selected and set by tuner (87) and oscillator(88) is amplified by(83). Mixer(84)in conjunction with oscillator(88)mixes the signal and produces a new intermediate frequency signal. Intermediate frequency amplifier(85) amplifies the new intermediate frequency signal. Intermediate frequency amplifier(86) amplifies the amplified signal again. The amplified signal passes through demodulator(89) and auxiliary jack(90). Sound amplifier(91) amplifies the sound carrier. Picture amplifier(92) amplifies the picture carrier. Color amplifier(93) amplifies the color carrier. Color amplifier(94) amplifies all associate color signals. Sound control(95)controls the sound. Picture control(96) controls the picture. Color control(97) controls the color. Outputs of (95),(96), (97) and (94) are mixed by mixer(98). Amplitude modulator(101) in conjunction with subcarrier oscillator(100)modulates the signals to a single subcarrier signal. Output amplifier(102) powers the subcarrier signal to modulate FM transmitter(103). Antenna(104) receives the output from (103) and transmits it into the air space of the surrounding area. Monitor(99) monitors the output of transmitter(103).

Figure 2:
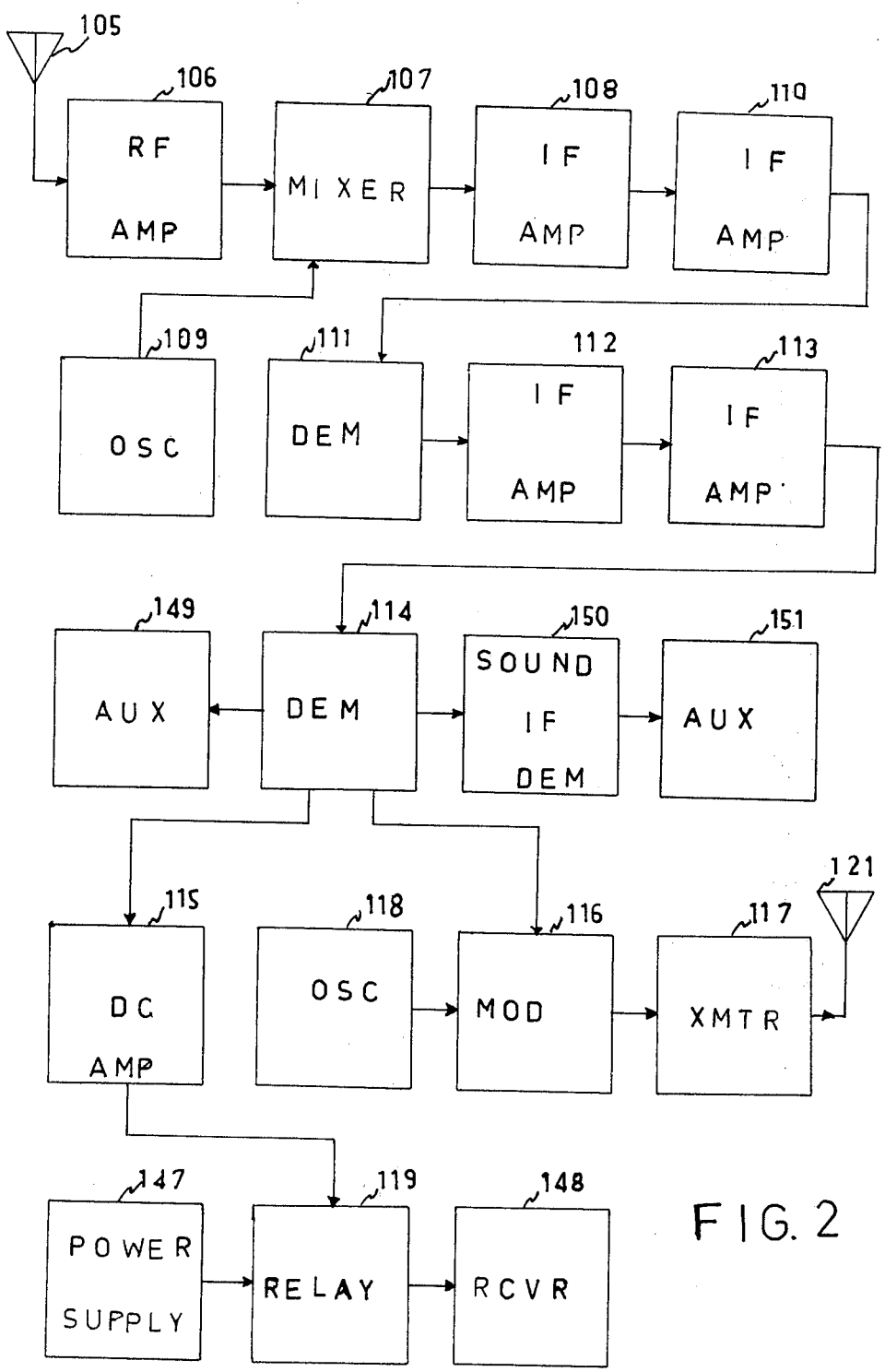
FIG. 2 is a block diagram of the "slave driver" coupler, that is remotely, wirelessly coupled to the master drive (FIG. 1) for television reception

Summarizing now the description of the "slave driver", coupler, used in conjunction with E.G.R.C. Model 3, master drive for television reception. See FIG. 2.

Figure 1:
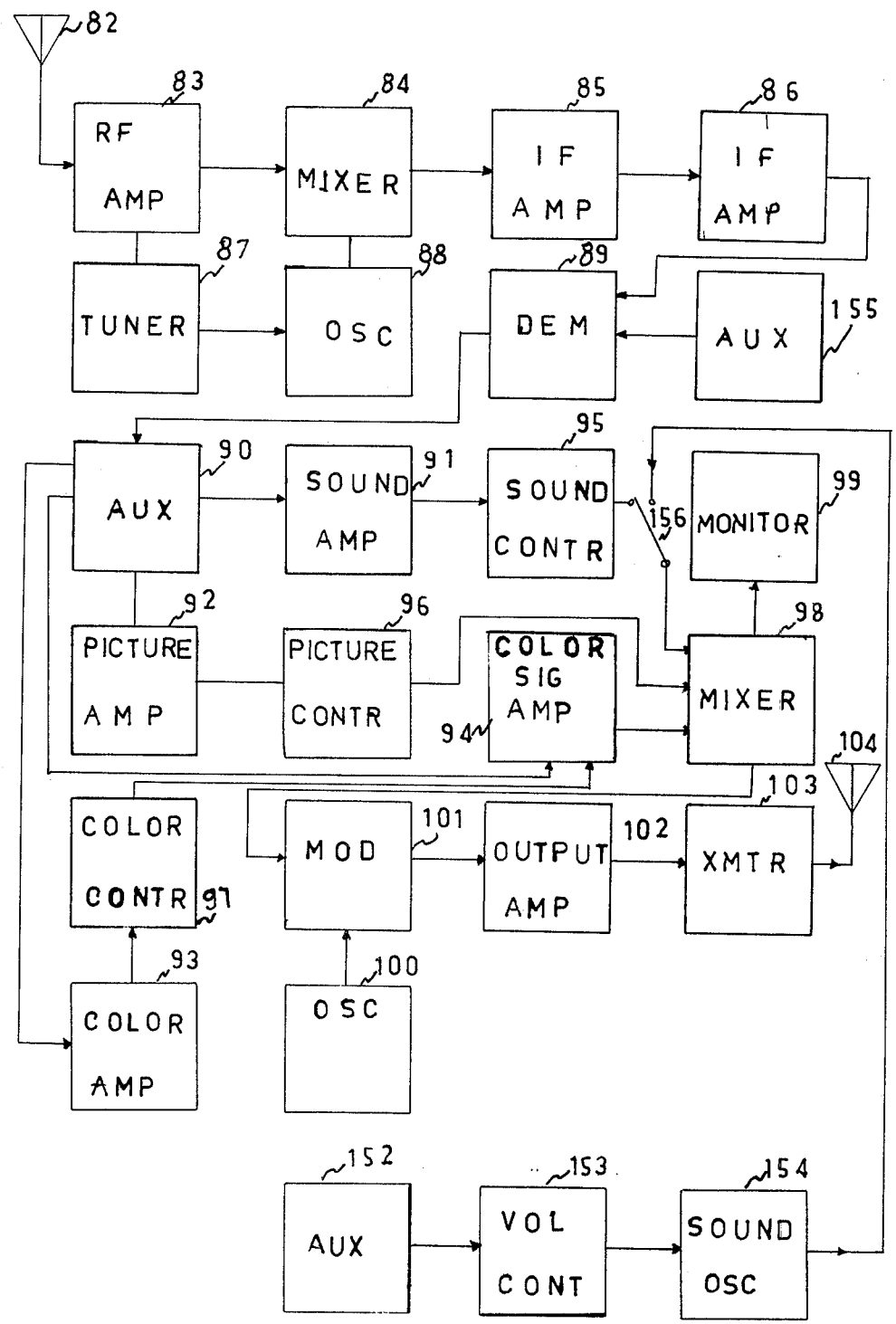
FIG. 1 is a block diagram of the Electronic Guided Remote Control (E.G.R.C.) master drive for television reseption

Antenna (105) receives the signal output of transmitter(103) (see FIG. 1). Radio frequency amplifier(106) pretuned to receive only the transmitted signal feeds the signal to mixer(107), which in conjunction with oscillator (109) mixes the signal to produce an IF signal. The IF signal is amplified by intermediate frequency amplifier(108). Intermediate frequency amplifier(110) amplifies the amplified signal again. The amplified intermediate frequency signal is demodulated by demodulator(111) whereby the main radio carrier is separated from the subcarrier. Intermediate frequency amplifier(112) amplifies the subcarrier. Intermediate frequency amplifier(113) amplifies the amplified signal again. Demodulator(114)removes the audio-video signal from the subcarrier. The audio-video signal output from (114) is passed on to amplitude modulator (116), which in conjunction with oscillator(118) amplitude modulates the signal. Transmitter (117) which is the transmitter of channel 12 sends the signal to antenna (121) which transmits it to the surrounding area not exceeding a foot's distance from the location of antenna(121). The DC level of the output of demodulator(114)which originates from the subcarrier IF signal is amplified by DC amplifier(115) thereby empowering relay switch (119) to turn ON the television receiver.

Figure 3:
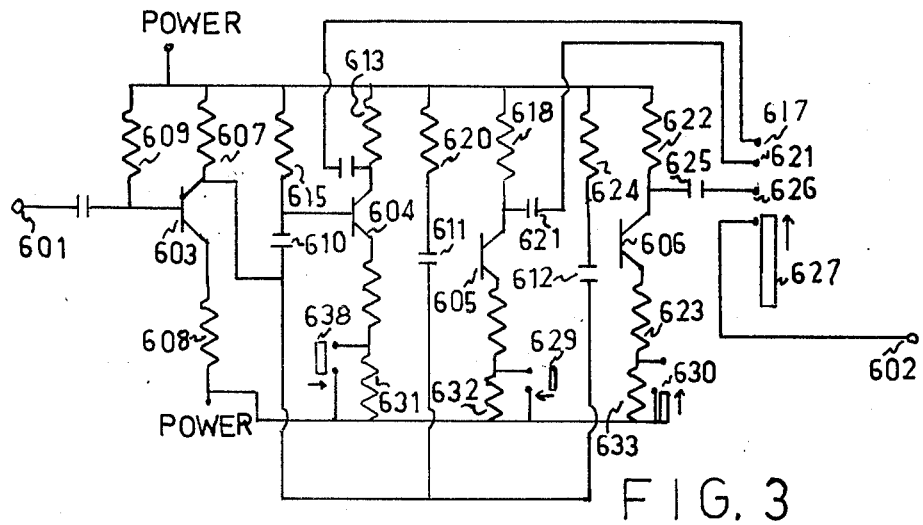
FIG. 3 is a circuit drawing providing the creation of a debth image.

FIG. 3 is a circuit illustrating a diagram for creation of an appearance of a debt picture providing a 3 dimentional effect.

Input 601 is connected to the output of picture amplifier 92 (FIG. 1) and output 602 is connected to picture control 96 (FIG. 1). Transistor 603 is a driver transistor which increases the signal from the input to drive three consecutive stages of transistors 604, 605, 606. Resistor 607 is the collector's resistor connecting collector of transistor 603 to power. Resistor 608 connects the emitor of transistor 603 to power. Resistor 609 biases transistor 603. Resistor 608 also aids in biasing transistor 603. The collector's output of transistor 603 is fed to capacitors 610, 611, 612. The signal is then fed from transistor 603 to the base of transistors 604–606. Resistor 613 connects collector of transistor 604 to power. Resistor 614 connects the emitor 604 to power and also acts partly so as to bias transistor 604. Resistor 615 is the bias resistor of 604. Transistor 604 will now amplify the picture signal and feed its output to capacitor 616 thus feeding said signal to its output 617. Resistor 618 connects collector of transistor 605 to power while resistor 619 connects the emitor of transistor 605 to power and also acts to partially bias transistor 605. Resistor 620 is the bias resistor of transistor 619. Capacitor 621 feeds the signal of transistor 605 to its output 621. Resistor 622 connects collector of transistor 606 to power while resistor 623 connects the emitor of transistor 606 to power, while acting to partially bias transistor 606. Resistor 624 biases tranistor 606. Capacitor 625 feeds the output of transistor 606 to its output 626. Switch 627 connects output 602 to the selection of outputs, namely, 626, 621,617. Switch 627 may also select one or more of said outputs e.g. 626 alone or 626, plus 621 or 626, 621, and 617.

In operation transistors 604–606 are actually parallel amplifier—meaning, they don't increase the ratio of the signal. There function is merely to provide 3 identical outputs of the same picture. These 3 identical signals will create an appearance of a debth picture.

Note, the addition of similar parallel stages of 604 or 605 or 606 cause a finer debth appearance whereby the more of such added stages the finer the debth appearance. Switch 628 and resistor 631 are used to reduce the gain of transistor 604. Switch 629 and resistor 632 are used to reduce the gain of resistor 605. Switch 630 and resistor 633 are used to reduce the gain of transistor 606. Switches 628–630 in conjunction with resistors 631–633 serve to balance the signal, providing a signal of an equal output so that with each stage of 604 or 605 or 606 when added and with the outputs connected will result in stronger contrast whereby switch 628, 629, 630 will reduce the contrast whereby an equal overall contrast will result along with a picture having the appearance of 3-D effect. Note that switch 628–630 generally will operate in conjunction with switch 627 whereby switch 627 will be a double pole whereby at each additional switching such as switching to output 626; thereafter, when switching to 621 to provide a picture of equal contrast but an in debth image appearance.

Figure 4:
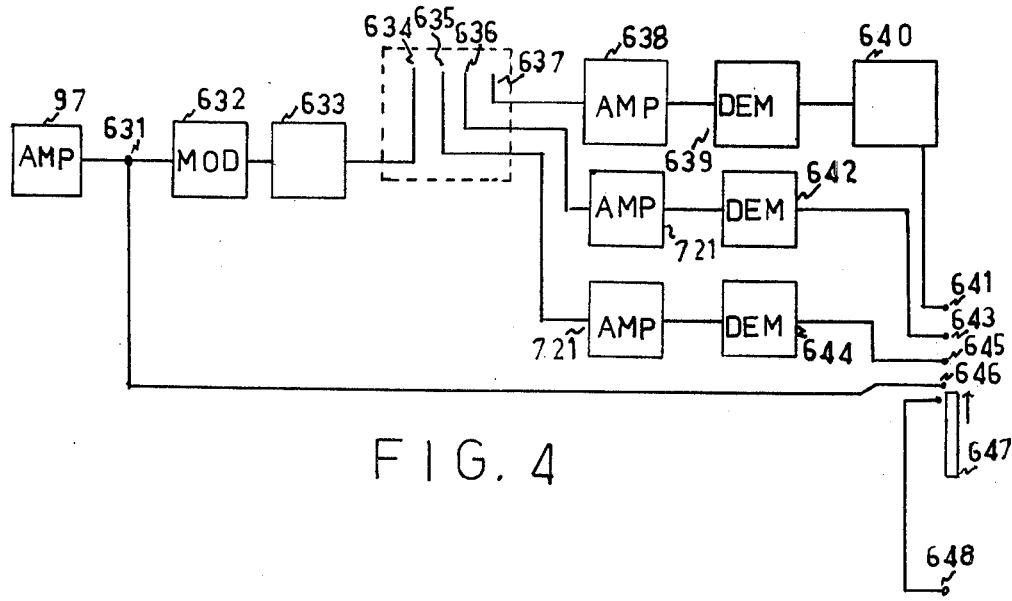
FIG. 4 is a drawing of the means for separating a video signal and creating individual signals

FIG. 4 is a system for separating a video signal, creating individual signals so as to have 3 different unconnected sources whereby a change to one source has no interference whatsoever to another source and serving to cause a delay between two or more sources thereby creating two signal sources for a 3-D affect.

Input 698 is connected to output amplifier 97 (FIG. 1).

The signal from input 698 is fed to modulator 632 modulating transmitter 633. Its transmitted signal is fed to pin 634 and thereafter the signal is passed on wirelessly to pins 635–637. Note pins 635–637 are encased within a metalic casing 638 said casing connected to ground so as to keep the transmitter's signal from transmitting outside the metal casing. Pins 634–637 are pieces of metal resembling the ½ inch straight pins dress makers use, said pins acting as antennas for transmitting and receiving in the above arrangement, providing thereby a signal wirelessly to the proceding stages 638–640 so that 638–640 stages will not require a connection to a circuit that may have interferance thus having its affect on the resulting picture image. Also it provides a delay between signals 635–637 which said signals stem from a single signal 634. Note also, that signal of 635 is the first signal followed by a second signal of 636 and thereafter followed by signal of 637 thus producing 3 pictures with some delay action. The delay of signals from 635–637 depends, upon their position in relation to antenna 634.

In order to increase or decrease the delay, pin 634 may be set into hollow piping of desired length, said piping grounded thus shielding any radiation the transmitted signal. Signal of pin 634 thereafter enters receive antenna 635, delayed by the length of said piping.

Signal from antenna 637 enters tuned amplifier 638. Tuned amplifier 638 is tuned to the frequency of transmitter 633. The signal of 638 is demodulated by demodulator 639 and thereafter fed to a second delay 640 (optional) and fed to its output 641

The signal of pin 636 enters tuned amplifier 720 which is tuned to the frequency of transmitter 633. Demodulator 642 demodulates the signal of tuned amplifier 720 and the signal is fed to output 643. The signal of pin 635 enters tuned amplifier 721 tuned to the frequency of transmitter 633. Demodulator 644 demodulates the signal of tuned amplifier 721 and signal is fed to output 645. Output 646 is the actual output of the vidio amplifier 97 (FIG. 1). Switch 647 connects all aoupots of 641, 643-646 to output 648. When all outputs are connected to 648, output 648 will feed a in debth appearance signal to picture control 96 (FIG. 1).

Note: all outputs are equal in amplitude and in phase, but are delayed one from another. Also, that delay 640 is optional Delay 640 in general would operate on the delay shown in FIG. 5. The delay in FIG. 5 a operates as follows: Input 649 feeds a first signal to output 650 through resistor 651 and capacitor 652. The same signal from input 649 is fed through resistor 653 and capacitor 654 to transistor 655. Transistor 655 amplifies said signal and feeds its amplified signal through capacitor 656 to a second amplifier, transistor 657. The output of transistor 657 is fed to capacitor 658 on to output 650. Resistor 659 connects the collector of transistor 655 to power and acts as an output. Resistor 660 biases transistor 655, while resistor 661 connects the emitor to power. Resistor 662 connects the collector of transistor 657 to power and acts as an output. Resistor 663 biases transistor 657 in conjunction with resistor 664 (optional). Resistor 665 connects transistor 657 to power.

In operation a first signal from input 649 is received at the output of 650. The same signal from 649 appears at output 650 through capacitor 658as a delayed second signal. The two said signals will be in phase e.g. if the signal input of 649 is at positive, then the 1st and 2nd signal stemming from capacitors 652,658 at output 650 will also be at the positive part of the cycle, but with a time delay between the first and second signal whereby the first signal stemming from capacitor 652 will lead the second signal from 658.

Resistors 661,665 are so chosen so that the output signal of capacitor 658 will equal the amplitude signal of the output signal of capacitor 652. In actual operation transistor 655,657 create a delay to the signal but do not add any amplitude. Note in dealing with a video signal two transistors would be used, since transistor 655 inverts the phase of the picture. Hence, transistor 655 is used to reinvert the picture to its original signal phase. Resistor 664 is optional. This resistor is used to remove the horizontal and vertical synchronizing pulses for the purpose of removing interference of the synchronizing signals. For a more detailed explaation of 664 see FIG. 5.

Note that stages similar to 655, 657 may be duplicated whereby when connected to the output of transistor 657 and whereby the output of the added stages are fed to capacitor 658 causes a longer delay between the first said signal and second said signal. Stages should be kept in pairs. Resistors 651,653, 666 serve to eliminate oscillation whereby any signal fed from capacitor 658 back to capacitor 652, resistor 651,653,666 would weaken the signal to reduce its strength to a level below oscillation. Also, inverse feedback may be used to cancel any oscillation that may occur with said inverse feedback connecting parts from collector's output of transistor 655 to emitter of transistor 657. Better still, using a transistor's coupling in the emmiter's circuit of transistor 655,657 to cancel out possibility of feedback.

Figure 6:
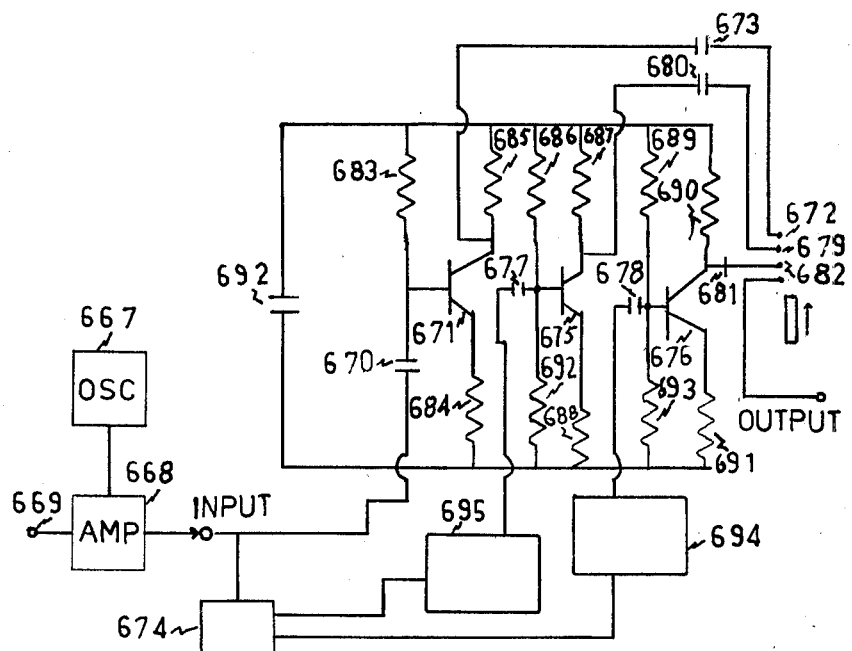
FIG. 6 is a drawing of a switching delay operation circuitry

FIG. 6 is a drawing of a switching delay operation circuitry.

Input 669 feeds a signal to amplifier 668. The output signal of 668 is fed to transistor 671 through capacitor 670. The output from transistor 671 is fed to output 672 via capacitor 673. The same signal of amplifier 668 is fed to oscillator electronic switching means 674 feeding the signal to the inputs of transistors 675,676 via capacitor 677, 678. The output of transistor 675 is fed to output 679 via capacitor 680. The output of transistor 676 is fed through capacitor 681 to output 682.

Resistor 683 biases transistor 671. Resistor 685 connects collector of transistor 671 to power while resistor 684 connects the emmiter to power and aids in biasing transistor 671. Resistor 686 biases transistor 675. Resistor 687 connects collector of transistor 675 to power. Resistor 688 connects emmiter of transistor 675 to power and aids in biasing transistor 675. Resistor 689 biases transistor 676. Resistor 690 connects collector of 676 to power. Resistor 691 connects the emmiter of 676 to power. Capacitor 692 is used as a power filter capacitor.

When creating one or more delayed signals in relationship to a signal, a problem may occur with picture smear due to the two synchronizing signals in an effort to synchronize the TV screen. These synchronizing signals may cause a smeared unclear picture or a loss of picture hold on the screen. Therefore, in circuitry shown in FIG. 6 we domonstrate how the synchronizing signals are removed from the delayed signal so that the TV screen would react to a single horizontal and vertical pulse thereby resulting in a single clear image and a 3-D effect with the addition of the delayed signal.

In operation, the output of transistor 671 provides a complete picture with perfect horizontal and vertical signals. The output of transistor 675 is biased by resistor 692 in conjunction with resistor 686. The same holds true for resistor 693 and resistor 689 biasing transistor 676. The biasing of transistor is so chosen as to cut off amplification amplitude other than picture. For example, using a voltage change 0-6 whereby this voltage would hold the entire video signal including the horizontal and vertical pulses, 0-6 is broken down to two parts whereby one part carries the actual picture image and a second part carrying the horizontal and vertical pulses. The said pulses would be transmitted on a 0-2 voltage change while the picture image is transmitted on a 2-6 voltage change. Amplifiers 675, 676 are set to a cut off level whereby amplification begins at 2; under 2 there is no amplification. Hence, horizontal and vertical signals are removed. Thus trasistor 675, 676 feeds only a picture image.

Transistor 671 first feeds a complete picture including horizontal and vertical signals. Thereafter the additional signals from 675,676 function only to provide debth imagry by delaying this signal.

Resistor 691 and 688 are so chosen so to provide the identical amplitude output of transistors 675, 676 at the point where amplification begins in relationship to the amplitude of transistor 671 so that all 3 signals will provide equal imagry on the screen.

694, 695 represent delay lines which can be increased or decreased for increasing or decreasing the 3-D affect. Electronic switch means 674 is made to switch the input signal stemming from amplifier 668 to pass said signal into transistor 675,676. Electronic switching means 674 may be made so as to switch the signal from amplifier 668 to inputs of transistors 675,676 and keep them switching back and forth to create a variety of different images. The oscillator in amplifier 674 may be varried to have different switching speeds.

One result of said switching function is the creation of imaginary 3-D debth by switching colors from a color to another back and forth between two set points on the screen, with the two points chosen at timed intervals. For example, if the resting time at the chosen points would be longer tean the scanning by about 3X longer, a double image would appear.

Amplifier 668 is also switchable by oscillator 667. Oscillator 667 causes amplifier 668 to pulsate the input signal of input 669, said pulsating may be so made so as to make a dark and light picture with each pulse i.e. one pulse dark, one pulse light; and/or to cause the picture to expand and contract thereby causing a variety of changes to picture. Oscillators 667,674 may be varied so as to change the pulse rate.

Figure 5:
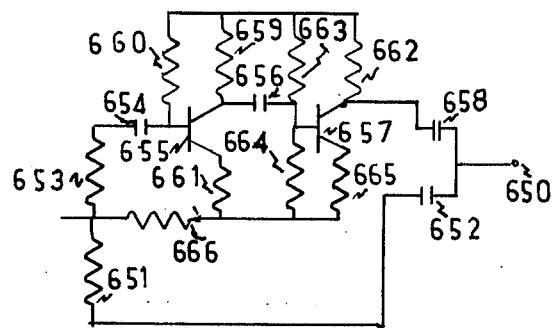
FIG. 5 is a drawing of the means for causing signal delay.

For greatest amount of manipulation and alteration of the video picture—color or black and white, FIG. 4,5,6 may be connected together so as to function in conjunction controlling one or more video units as follows:

Input 669 (FIG. 4) is connected to output 643 (FIG. 5). Input 601 (FIG. 4) is connectoe to output 646 (FIG. 5). Outputs 648 (FIG. 5) 696 (FIG. 6) 602 (FIG. 4) are connected together and connected to the video monitor thereby enabling the control of the picture in a variety of ways as three types of signals are obtained. Whereby FIG. 4 would be used to refine the overall video picture, FIG. 6 would be used to pulsate the colors for a desired color affect, shile output 645 and 641, which would also be connected with outputs 648,696, 602— would create the debth shading of the picture.

Note:by using a similar type recording system and operation described for audio in copending application but using a higher rate of speed for the tape transport and video recording tape so as to carry a video signal debth imagry may also be obtain so as to provide a 3-D affect.

When the system shown in FIG. 4 of copending application for video recording head 216 would be connected to input capacitor 670 feeding transistor 671 (FIG. 6) head 215 (FIG. 4 of copending application) would be connected to input capacitor 677 feeding its input to transistor 675 (FIG. 6); Head 217 (FIG. 4 of copending application) would be connected to input capacitor 678 feeding to transistor 676 (FIG. 6)

In operation transistor 671 (FIG. 6) would create the entire video image including horizontal and vertical pulses. Transistor 675,676 (FIG. 6) would create the debth imagry shading but would have no bearing on synchronizing signals. Note using FIG. 6's output, 672,679, 682, connecting them to the input of a video recorder a 3-D recording can be accomplished from a single signal, providing a playback of 3-D imagry affect from tapes.

It should be noted that where varyations are required to change a signal as desired or to add in different signals via a TV game, for example, or other video circuit, for remote wireless control os said game or circuit, the unit or circuit would be connected between demodulator 89 and auxiliary 90 (FIG. 1). This connection would provide wireless remote control of the TV game over the TV without any wired connections to the TV.

Note also, that by tuning the slave driver (FIG. 2) to the frequency of the intermediate amplifiers in the receiver to be controlled remotely, we can transmit directly to the IF section of the receiver without the need of a tuner. Hence, If we transmit via the slave driver a 10.7 mc signal, with added strength the signal will an FM receiver even the tuner is entirely broken as as the IF section is in operation.

Also, when auxiliary jacks are used that provide the capability of removing one signal and adding in another signal and mixing same with an old signal:such as removing the sound from a television composite signal and injecting a different sound whereby the first remote control apparatus receiving the full original transmitted signal, transmitting it within its transmission range area, the second remote control apparatus would remove the sound only from the first remote control transmitted signal, adding its own new sound, thus feeding an old signal an a new signal within its transmission area. One preactical use for this arrangement may be as follows: In an area where two different languages are required to explain a picture shown on a (television) screen, a first remote control apparatus would transmit the original picture and an explaination in one language, while a second remote control apparatus would transmit the same picture and a second language (removing the first language) explaination (a third remote control apparatus could even transmit the original picture and a third language explaination, and so on).

We claim:

1. Remote television channel selection and plural function control apparatus comprising:
   a A tuner for receiving a composite television signal including luminance, chrominance and audio information modulated on a carrier on any one of a plurality of channels,
   b. means located at said control apparatus for manually varying the channel selection of the tuner,
   c. demodulator connected to said tuner for providing said luminance, chrominance and audio information in a baseband format,
   d. means comprising an auxiliary jack means located subsequent of the demodulator to facilitate the addition or mixing of an auxiliary intelligence signal into the incoming signal when it is in the baseband format,
   e. means comprising circuitry means connected between said auxiliary jack means and controls, whereby said circuitry means providing a simulated debth picture giving a three dimensional affect, whereby two or more picture images of a single picture are set on a single television picture tube with the said two or more picture images stemming from two or more individual transmission means being modulated by one or more image signals of a single picture, and whereby a single signal is reproduced two or more times creating thereby two or more images of a single picture signal and feeding the said two or more created images on the television screen as one and whereby delaying one image from two or more images of the same picture on the screen and whereby using pulse switching means to alternate color or amplifiers to create a variety of three dimentional affects.
   f. means located at said control apparatus for manually varying the characteristics of the baseband luminance, chrominance and audio information as a function of viewer preferance,
   g. means for remodulating and transmitting electromagnetically the composite television signal to a remotly located television receiver on an unused channel via wireless transmission
   h. the remote control of both tuning and other receiver functions being effected without direct connection or modification to the receiver
   i. a wireless coupler providing the means for separately retrieving the said auxiliary intelligence signal and reproducing the same.

2. An apparatus of claim 1 wherein said circuitry means providing a simulated debth picture giving a three dimentional affect comprising a first amplifier feeding its output signal into two or more amplifiers connected in parallel and whereby their outputs are also connected in parallel thereby reproducing two or more pictures of a single image and whereby one of the said two or more amplifiers produces a full video signal including horizontal and vertical signals while the remainder of said amplifiers are used to provide a singnal for debth shading and whereby the said remainder amplifiers are connected to output through signal delay means, thereby delaying the signal and increasing thereby the said three dimentional affect and whereby employing pulse switching means connected to the input of said one or more amplifiers for creating a variety of special said three dimensional effects and whereby said pulse switching means alternately pulsates color changes of a color video picture giving a three dimentional affect.

3. An apparatus of claim 1 wherein said circuitry means providing a simulated debth picture giving a three dimentional affect comprising whereby a single wireless transmitted signal is recreated to two or more signals and, whereby creating a delayed signal between one or more signals from the said recreated signal thereby having an output of two or more signals at its output, said output creating said signal from a single transmitted signal whereby the means producing said two or more output signals are physically not connected at their input and not connected to one another thus eliminating interference between signals; a modulator modulating a single signal on a transmitter, said transmitter transmitting its signal to two or more tuned amplifiers via the antennas of said transmitter and said tuned amplifiers, said two or more amplifiers amplifying the transmitted signal; two or more demodulators demodulating the signal of said tuned amplifiers and feeding same to two or more outputs; delay means for delaying the outputs of the said demodulator by delaying one or more of the said two or more outputs, and whereby the resulting signals are thereafter fed to a single video amplifier stage.

4. An apparatus ofclaim 1 wherein said wireless coupler comprising,
   a. a tuner for receiving the composite transmitted said auxiliary intelligence signal,
   b. a first demodulator connected to said tuner for providing luminance, chrominance, and audio information in a baseband format, or providing a modulated subcarrier signal, c. a first one or more tuned amplifiers priviing amplification of the said modulated subcarrier signal
d. a second demodulator connected to said first one or more tuned amplifiers for providing said luminance, chrominance information in baseband format and audio subcarrier signal,
e. a second one or more tuned amplifiers connected to a third demodulator for providing audio information in baseband format,
f. a first auxiliary output jack means connected to said third demodulator for providing an output source of the baseband audio signal,
g. a second auxiliary output jack means connected to said second demodulator for providing an output in baseband format of said luminance, chrominance, information, and said audio subcarrier signal,
h. means for remodulating and transmitting electromagnetically the composite television signal to a nearby located television receiver on an unused channel via wireless transmission, or whereby the antenna of said television receiver is wired to the transmitter or modulator of said wireless coupler,
i. means for controlling a relay switch for switching on or off the power from a power supply for an electrical appliance.

5. A plurality of remote control apparatuses of claim 1 wherein is provided the means located at each of said plurality of said remote control apparatuses when each one is tuned to receive signals one from the other, to receive a composite audio-video signal and remove the original audio or vidio signal from said composite audio-vidio signal and add a new audio or vidio signal and retransmitting the resulting composite audio-vidio signal wirelessly to one or more of said remote control apparatuses or receivers thereby providing the means for mixing a plurality of audio or vidio signals with a single or composite audio or vidio signal.

* * * * *